United States Patent [19]
Inoguchi et al.

[11] 4,385,129
[45] May 24, 1983

[54] METHOD FOR PRODUCING A CORDIERITE BODY

[75] Inventors: Kazuhiro Inoguchi, Okazaki; Tomohiko Nakanishi, Kariya; Kunio Okamoto; Mitsuru Asano, both of Okazaki, all of Japan

[73] Assignee: Nippon Soken, Inc., Nishio, Japan

[21] Appl. No.: 289,979

[22] Filed: Aug. 4, 1981

[30] Foreign Application Priority Data

Nov. 8, 1980 [JP] Japan .................................. 55/157277

[51] Int. Cl.³ ............................................ C04B 35/04
[52] U.S. Cl. .................................... 501/118; 501/119; 501/153; 501/154
[58] Field of Search ............... 501/108, 118, 119, 153, 501/154

[56] References Cited

U.S. PATENT DOCUMENTS

| | | | |
|---|---|---|---|
| 3,885,977 | 5/1975 | Lachman et al. | 501/119 |
| 3,954,672 | 5/1976 | Somers et al. | 501/119 |
| 4,001,028 | 1/1977 | Frost et al. | 501/118 |
| 4,235,855 | 11/1980 | Cleveland | 501/119 |

*Primary Examiner*—James Poer
*Attorney, Agent, or Firm*—Cushman, Darby & Cushman

[57] ABSTRACT

A method for producing a cordierite body having isotropic coefficient of thermal expansion comprises the steps of preparing a batch by mixing and kneading particles of fired talc, alumina supplying substance such as alumina and aluminum hydroxide, and silica supplying substance such as silica and kaoline, anisostatically forming the batch and drying and firing the obtained formed body.

14 Claims, 2 Drawing Figures

METHOD FOR PRODUCING A CORDIERITE BODY

BACKGROUND OF THE INVENTION

The present invention relates to a method for producing a cordierite body, particularly to a cordierite body to be used as the material of the parts subjected to repeated cycles of rapid increases and decreases in temperature.

Cordierite ($2MgO.2Al_2O.5SiO_2$) has an excellent low thermal expansion property. Therefore, cordierite is used as the material of parts requiring thermal shock resistance in order to endure the repeated cycles of rapid increases and decreases in temperature, such as a catalyst support for purifying exhaust gas and a porcelain insulator.

The coefficient of thermal expansion of cordierite has been generally known as $26.0 \times 10^{-7}/°C$. in the range of 25° to 1000° C.

Recently, ceramic having more excellent thermal shock resistance has been required. Upon making various studies, a cordierite body having excellent low expansion property as low as $17.0 \times 10^{-7}/°C$. (25° to 1000° C.) can be obtained by eliminating alkali metals such as natrium and kalium, alkaline-earth metals such as calcium and other impurities having an adverse effect on the low thermal expansion property of cordierite, from the material.

Furthermore, it has been reported that by orienting the anisotropic property of the cordierite crystals, cordierite bodies having coefficients of thermal expansion of less than $11.0 \times 10^{-7}/°C$. in the range of 25° to 1000° C. in at least one direction can be obtained.

For example, one of the methods for orienting the cordierite crystals to reduce the thermal expansion of the cordierite body in at least one direction is shown in U.S. Pat. No. 3,885,977.

In U.S. Pat. No. 3,885,977, there is stated that a cordierite body having thermal expansion as low as $11.0 \times 10^{-7}/°C$. in a specific direction is obtained by forming a batch raw material containing plate-shaped clay particles or stacked clay which can be delaminated into plate-shaped particles during processing by such means as to impart a planar orientation to the plate-shaped clay particles, for example, extrusion forming, drying and firing the obtained formed body.

As described above, by anisostatically forming a batch raw material mainly composed of plate-shaped particles of kaolin mineral and talc, a planar orientation is imparted to the plate-shaped particles, and the obtained cordierite body exhibits a low expansion property in the direction along the extrusion direction.

However, coefficients of thermal expansion of the obtained cordierite body in the direction perpendicular to the extrusion direction and that of the thickness thereof remain larger than that in the extrusion direction thereof. The difference of the coefficients of thermal expansion becomes larger as the coefficient of thermal expansion in the extrusion direction becomes smaller.

When coefficients of thermal expansion in the above described directions are largely different from each other, the cordierite body is liable to be damaged due to thermal distortion when being subjected to rapid increases and decreases in temperature.

In the cordierite honeycomb structure which is formed by extruding, the difference between the coefficient of thermal expansion in the direction of wall thickness and that in the extruding direction is not a serious problem, since the wall thickness of the honeycomb structure is very thin and also between adjacent thin walls, open passages are formed.

However, large difference between the coefficient of thermal expansion in the extruding direction and that in the direction which is perpendicular to the extruding direction on the same plane thereas, causes the honeycomb structure to be damaged.

The cordierite body which is obtained by mixing and kneading the batch raw material containing plate-shaped particles, forming the batch raw material by anisostatic forming means such as extrusion forming and firing the formed body, exhibits an anisostatic property in its coefficient of thermal expansion.

Talc has been used as one of main ingredients of the batch raw material. When the talc is pulverized, it is usually delaminated along (001) plane into plate shaped particles. Therefore, the cordierite body which is obtained by extruding the batch raw material containing talc particles also exhibits anisostatic property in the coefficient of thermal expansion.

One object of the present invention is to provide a method for producing a cordierite body having low coefficient of thermal expansion in any direction.

Another object of the present invention is to provide a method for producing a cordierite body which does not shrink during the firing step.

Still another object of the present invention is to provide a method for producing a product made of cordierite, which is required to have such thermal shock resistance as to endure the repeated cycles of rapid increase and decrease in temperature, for example, a catalyst support for purifying exhaust gases, and a porcelain insulator.

A further object of the present invention is to provide a cordierite body having isotropic thermal expansion property and low coefficient of thermal expansion by means of anisostatic forming.

DESCRIPTION OF THE DRAWINGS

Other objects and advantages of the invention will become apparent from the following description of embodiments with reference to the accompanying drawings wherein.

SUMMARY OF THE INVENTION

Figure 1:
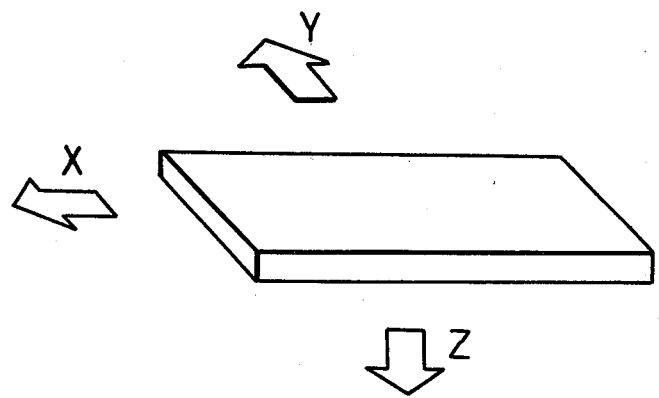
FIG. 1 is a perspective view of a sheet shaped cordierite body which is obtained by extrusion forming.
Figure 2:
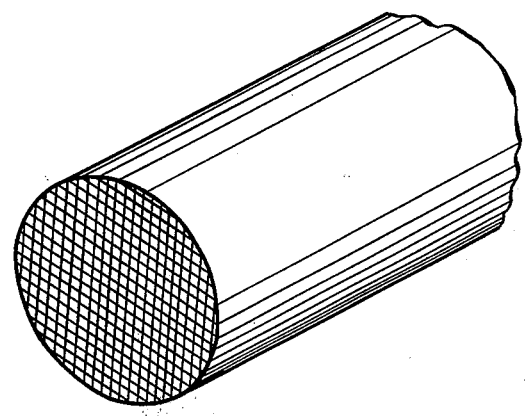
FIG. 2 is a perspective view of a honeycomb structured cordierite body which is obtained by extrusion forming.

We inventors have made various studies and experiments in order to attain the above described objects. And as a result, we have found that the cordierite body having low coefficient of thermal expansion in any direction and excellent thermal shock resistance can be obtained by mixing and kneading the cordierite batch raw material containing fine fired talc particles which are prepared by pulverizing fired talc particles, forming the kneaded material by anisostatic forming means such as extrusion forming, and firing the formed body.

As described above, when raw ralc (hereinafter will be called "talc") is pulverized, it is delaminated into plate shaped particles.

We inventors have found that when talc is fired at 870° C. or more, talc is transformed into enstatite mineral (MgO.SiO$_2$) and crystbarite (SiO$_2$) and that when the fired talc is pulverized, it is delaminated in the direction different from that in the case of unfired talc, into isodimensional particles. In contrast, when the talc is not pulverized after being fired, isodimensional particles are not formed even if the pulverizing operation is effected before firing operation.

The most important point of the present invention is that the isodimensional particles of the fired talc are used as one of main ingredients of the batch raw material.

And when the batch raw material is extruded, the particles of the fired talc are not oriented in one direction since they have isodimensional shape respectively. And by firing the extruded body, a cordierite body having isotropic coefficient of thermal expansion can be obtained.

The coefficient of thermal expansion of the obtained cordierite body in each direction is as low as about $16.0 \times 10^{-7}$/°C. (25° to 1000° C.) or less.

When the cordierite body is produced by firing the batch raw material containing talc, shrinkage is apt to be generated during the firing step since talc contains water and is a thermally unstable substance. When the batch raw material containing talc is fired, the cordierite body shrinks due to the disappearance of water so that distortion is generated within the cordierite body.

According to the present invention, since the fired talc which does not contain water and is thermally stable, is used, distortion of the cordierite body caused by the shrinkage thereof can be decreased and the crystallinity thereof can be increased.

In the present invention, the batch raw material is composed of at least one alumina supplying substance such as alumina and aluminum hydroxide, at least one silica supplying substance such as silica and kaolin and the fired talc as a magnesia supplying substance, which is prepared by the above described method.

The preferable composition ratio of the fired talc ranges from 30 to 45% by weight of the batch raw material.

The preferable firing temperature for producing the fired talc is about 900° C. or more.

At a temperature under 900° C., water contained within raw talc scarcely disappears or partially disappears. And the obtained cordierite body still has thermally unstable property. Therefore, the shrinkage rate is not decreased and excellent crystallinity cannot be obtained.

And high firing temperature not less than 1400° C. is unnecessary for preparing the fired talc.

The preferable firing temperature for producing the cordierite body from the extruded body ranges from 1340° C. to 1460° C.

DETAILED DESCRIPTION OF THE INVENTION

Hereinafter, the present invention will be explained in detail based on experiments.

Experiment 1

Delaminated plate-shaped talc particles having average particle diameter of 103μ (Sample A), 74μ (Sample B), 30μ (Sample C), 16μ (Sample D) and 8μ (Sample E) respectively were fired at 1200° C. for 2 hours.

The average particle diameter of the obtained fired particles of each sample was 100μ, 72μ, 28μ, 15μ and 7μ respectively.

By pulverizing the fired talc particles of each sample, various kinds of fired talc particles were obtained as shown in Table 1.

In Table 1, the pulverizing ratio of the fired talc is expressed by the following equation:

Pulverizing Ratio of Fired Talc =

$$\frac{\text{Average Particle Diameter of Pulverized Fired Talc}}{\text{Average Particle Diameter of Fired Talc}} \times 100$$

(The pulverizing ratio when the fired talc is not pulverized is expressed by 100%)

Next, the pulverized fired talc particles shown in Table 1, were mixed with aluminum hydroxide particles having an average particle diameter of 1.2μ and kaolin particles having an average particle diameter of 6.3μ in the mixing ratio by weight of SiO$_2$:Al$_2$O$_3$:MgO=51.36:34.86:13.78. Water and binder were added to each batch raw material and kneaded together. Then, each kneaded batch raw material is extruded by means of an extrusion die provided with a slit to form a sheet shaped body 55 mm in width and 3 mm in thickness shown in FIG. 1.

The obtained sheet shaped bodies were fired at a temperature up to 1400° C. for 5 hours. Consequently, sheet shaped cordierite bodies were obtained.

And the coefficient of thermal expansion of the sheet shaped cordierite body of each sample in X direction (extruding direction), Y direction (the direction perpendicular to the extruding direction) and Z direction (the direction of wall thickness of the cordierite body) in the range of 25° to 1000° C. was measured.

The length of each sample of which coefficient of thermal expansion in X and Y directions was measured, was 50 mm in each measuring direction.

And the samples which were used for measuring the coefficient of thermal expansion in Z direction were prepared by extruding the batch raw material into a plurality of sheet shaped bodies, layering the obtained sheet shaped bodies, pressing the layered bodies into 50 mm in total thickness, and firing the obtained compact body.

The experimental result is shown in Table 2.

As is apparent from the experimental result, the cordierite bodies which were produced from the batch raw material containing the plate-shaped fired talc particles of which pulverizing ratio was 100% exhibited distinguished anisotropy of coefficient of thermal expansion.

In contrast, when the batch raw material containing the pulverized fired talc was used, the anisotropy of coefficient of thermal expansion of the obtained cordierite bodies was decreased. In particular, when the fired talc of which pulverizing ratio was 50% or less was used, the coefficient of thermal expansion in each direction approached to each other. Furthermore, when the fired talc of which pulverizing ratio was 30% or less, was used, the coefficient of thermal expansion in each direction became nearly equal to each other.

It is considered that the above result is caused by the fact that the more the fired talc is pulverized, the more the plate-shaped form of the fired talc particles is transformed into the isodimensional form so that the planar orientation is not imparted to the fired talc particles during the extruding step.

TABLE 1

| Pulverizing Ratio of Prefired Talc (%) | Sample |  |  |  |  |
|---|---|---|---|---|---|
|  | A | B | C | D | E |
|  | Average Particle Diameter (μ) |  |  |  |  |
|  | 103 | 74 | 30 | 16 | 8 |
| 100 | 100 | 72 | 28 | 15 | 7 |
| 70 | — | — | — | 10.5 | 5.0 |
| 60 | — | 41 | 17 | 9.0 | 4.0 |
| 50 | 49 | 36 | 14 | 7.4 | 3.5 |
| 40 | 36 | 29 | 10 | 6.2 | 3.1 |
| 30 | 33 | 20 | 7.2 | 4.5 | 2.0 |
| 20 | 22 | 14 | 5.6 | — | — |
| 10 | 9.5 | 7.0 | 2.4 | — | — |

TABLE 2-1
(Sample A)

| Fired Talc | | Coefficient of Thermal Expansion ($\times 10^{-7}/°C.$) | | |
|---|---|---|---|---|
| Pulverizing Ratio (%) | Average Particle Diameter (μ) | X Direction | Y Direction | Z Direction |
| 100 | 100 | 9.2 | 11.8 | 22.5 |
| 70 | — | — | — | — |
| 60 | — | — | — | — |
| 50 | 49 | 11.7 | 13.2 | 19.4 |
| 40 | 36 | 13.3 | 14.8 | 17.0 |
| 30 | 33 | 14.2 | 15.6 | 16.2 |
| 20 | 22 | 15.3 | 15.9 | 15.8 |
| 10 | 9.5 | 15.4 | 16.0 | 16.2 |

TABLE 2-2
(Sample B)

| Fired Talc | | Coefficient of Thermal Expansion ($\times 10^{-7}/°C.$) | | |
|---|---|---|---|---|
| Pulverizing Ratio (%) | Average Particle Diameter (μ) | X Direction | Y Direction | Z Direction |
| 100 | 72 | 9.8 | 11.9 | 21.2 |
| 70 | — | — | — | — |
| 60 | 41 | 11.8 | 13.5 | 19.2 |
| 50 | 36 | 12.7 | 14.4 | 18.3 |
| 40 | 29 | 14.2 | 16.1 | 16.6 |
| 30 | 20 | 15.0 | 15.4 | 16.0 |
| 20 | 14 | 15.5 | 15.3 | 15.9 |
| 10 | 7.0 | 15.4 | 15.7 | 15.8 |

TABLE 2-3
(Sample C)

| Fired Talc | | Coefficient of Thermal Expansion ($\times 10^{-7}/°C.$) | | |
|---|---|---|---|---|
| Pulverizing Ratio (%) | Average Particle Diameter (μ) | X Direction | Y Direction | Z Direction |
| 100 | 28 | 10.0 | 12.1 | 20.3 |
| 70 | — | — | — | — |
| 60 | 17 | 12.7 | 14.2 | 18.5 |
| 50 | 14 | 14.6 | 15.3 | 16.0 |
| 40 | 10 | 14.7 | 15.3 | 15.6 |
| 30 | 7.2 | 15.0 | 15.6 | 16.4 |
| 20 | 5.6 | 15.3 | 15.4 | 15.9 |
| 10 | 2.4 | 14.6 | 15.3 | 16.0 |

TABLE 2-4
(Sample D)

| Fired Talc | | Coefficient of Thermal Expansion ($\times 10^{-7}/°C.$) | | |
|---|---|---|---|---|
| Pulverizing Ratio (%) | Average Particle Diameter (μ) | X Direction | Y Direction | Z Direction |
| 100 | 15 | 10.8 | 12.7 | 19.8 |
| 70 | 10.5 | 11.5 | 13.3 | 19.2 |
| 60 | 9.0 | 12.6 | 13.9 | 18.7 |
| 50 | 7.4 | 14.6 | 15.5 | 16.2 |
| 40 | 6.2 | 15.2 | 15.4 | 15.8 |
| 30 | 4.5 | 15.0 | 15.5 | 15.7 |
| 20 | — | — | — | — |
| 10 | — | — | — | — |

TABLE 2-5
(Sample E)

| Fired Talc | | Coefficient of Thermal Expansion ($\times 10^{-7}/°C.$) | | |
|---|---|---|---|---|
| Pulverizing Ratio (%) | Average Particle Diameter (μ) | X Direction | Y Direction | Z Direction |
| 100 | 7.0 | 11.1 | 13.0 | 19.2 |
| 70 | 5.0 | 12.5 | 14.1 | 18.8 |
| 60 | 4.0 | 12.9 | 14.6 | 18.2 |
| 50 | 3.5 | 14.4 | 15.5 | 16.1 |
| 40 | 3.1 | 15.3 | 15.3 | 16.2 |
| 30 | 2.0 | 15.2 | 15.5 | 15.4 |
| 20 | — | — | — | — |
| 10 | — | — | — | — |

Experiment 2

The batch raw materials containing the fired talc particles of Sample C of Experiment 1 were mixed and kneaded together and extruded by means of an extrusion die. As a result, columnar honeycomb structured catalyst supports for purifying exhaust gases, of which diameter was 93 mm, wall thickness was 0.30 mm and cell density was 300 cells per square inch respectively, were obtained.

These catalyst supports were heated at a predetermined temperature for 50 minutes within an electric furnace, and then taken out of the electric furnace. Next, they are allowed to cool to room temperature.

This heating and cooling cycle was repeated.

And the thermal shock resistance of each obtained catalyst supports was estimated by the number of repeated cycles and the temperature within the electric furnace when cracks were generated in each catalyst support.

The experimental result is shown in Table 3.

TABLE 3

| Average Particle Diameter of Fired Talc (μ) | Temperature (°C.) | | |
|---|---|---|---|
|  | 800 | 850 | 900 |
| 28 | 5 | 5 | 1 |
| 17 | 5 | 5 | — |
| 14 | 5 | 5 | 4 |
| 10 | 5 | 5 | 4 |
| 7.2 | 5 | 5 | 3 |
| 5.6 | 5 | 5 | 5 |
| 2.4 | 5 | 5 | 4 |

Furthermore, out of the obtained samples, the catalyst supports using the fired talc having average particle diameter of 28μ (pulverizing ratio is 100%), 14μ (50%) and 5.6μ (20%) respectively were heated at 800° C. for 50 minutes within an electric furnace and then were allowed to cool at a room temperature for 50 minutes.

This heating and cooling cycle was repeated.

The number of the repeated cycles when cracks were generated in the catalyst supports is shown in Table 4.

TABLE 4

| Average Particle Diameter (μ) | 28(100%) | 14(50%) | 56(20%) |
|---|---|---|---|
| Number of Times | 10 | 50 | 55 |

As is apparent from the experimental result, the cordierite catalyst supports which were obtained from the batch raw material containing the pulverized fired talc exhibited excellent thermal shock resistance.

As described above, when talc is pulverized, it is delaminated along a specified direction into plate-shaped particles. The cordierite body which is obtained by extruding the batch raw material containing the plate-shaped talc particles exhibits a low thermal expansion property in the extruding direction but have relatively large coefficient of thermal expansion in the other directions. Therefore, the cordierite body is easily damaged due to thermal distortion thereof when being subjected to rapid temperature change.

The present invention is characterized in that the talc to be included in the batch raw material is prepared by firing raw talc particles previously and pulverizing the fired talc particles.

The present invention makes a practical application of the fact that the fired talc particles lose the plate-shaped form thereof when being pulverized.

By using the pulverized fired talc, the difference of the coefficient of thermal expansion of the obtained cordierite body in each direction is decreased.

And the more the fired talc particles are pulverized, the more the coefficient of thermal expansion of the obtained cordierite body in each direction approaches to each other.

In particular, when the particle diameter of the pulverized fired talc is reduced to about one half or less of that of the unpulverized fired talc particles, the coefficient of thermal expansion of the obtained cordierite body in each direction becomes easily equal. And the obtained cordierite body exhibits such low thermal expansion property and such excellent thermal shock resistance as to be practically used as a member subjected to repeated cycles of rapid increase and decrease in temperature, for example, a catalyst support for purifying exhaust gases.

Furthermore, according to the present invention, since the fired talc is used, distortion which is generated when the extruded body is fired, can be decreased.

Having now fully described the invention, it will be apparent to one of ordinary skill in the art that many changes and modifications can be made thereto without departing from the spirit or scope of the invention as set forth herein.

What is claimed is:

1. A method for producing a cordierite body comprising the steps of:
   (a) preparing a batch by mixing and kneading raw materials composed of magnesia, alumina and silica-supplying substances, the magnesia supplying substance composed of particles of fired talc produced by delaminating a block of raw talc into plate-shaped particles, firing said plate-shaped particles and pulverizing said fired particles into fine, isodimensional particles;
   (b) anisostatically forming said batch into a formed body; and thereafter
   (c) drying and firing said formed body to produce a cordierite body.

2. A method according to claim 1, wherein:
   said alumina supplying substance is at least one of aluminum hydroxide and alumina; and
   said silica supplying substance is at least one of silica and kaolin.

3. A method according to claim 1, wherein:
   said batch contains 30 to 45% by weight of fired talc.

4. A method according to claim 1, wherein:
   said batch is anisostatically formed into said formed body by extrusion forming.

5. A method according to claim 1, wherein:
   said formed body is fired in step (c) at 1340° C. to 1460° C.

6. A method according to claim 1, wherein:
   said fired particles are pulverized so as to have average diameter of not more than 50μ.

7. A method according to claim 1 wherein:
   said fired particles are pulverized so as to have average diameter of not more than 50% of that of said fired particles.

8. A method according to claim 1, wherein:
   said plate-shaped particles are fired at 900° C. to 1400° C.

9. A method for producing a cordierite body having a honeycomb structure, said method comprising the steps of:
   (a) mixing and kneading raw materials containing fired, fine, isodimensional talc particles not greater than about 50 microns in size and particles of alumina and silica supplying substance to form a batch;
   (b) extruding said batch by means of an extrusion die provided with grid-shaped extrusion slots into a honeycomb structure having a large number of open passages separated by thin walls; and
   (c) drying and firing said honeycomb structure.

10. A method of producing a cordierite body exhibiting improved thermal shock resistance and a low coefficient of thermal expansion in all directions, said method comprising the sequential steps of:
   (a) firing delaminated talc particles at a temperature of greater than 900° C. to remove water and thermally stabilize the talc particles; and thereafter,
   (b) pulverizing the thus fired talc particles to produce fine, isodimensional particles, provided that the pulverizing is conducted so that the ratio of:

$$\left[ \frac{\text{average particle diameter of pulverized fired talc}}{\text{average particle diameter of unpulverized fired talc}} \right] \times 100$$

does not exceed 50%;
   (c) preparing a formable batch by mixing and kneading together alumina-containing and silica-containing materials together with from 30 to 45% by weight of the fired fine particles of step (b);
   (d) anisostatically forming the batch into a formed body, and thereafter
   (e) drying and firing the formed body, the resulting cordierite body having a coefficient of thermal expansion in all directions no greater than $16.0 \times 10^{-7}/°C.$ over the range of 25° to 1000° C.

11. The method of claim 10 in which the talc particles are fired in step (a) at a temperature in the range of about 900° C. to about 1400° C.

12. The method of claim 10 in which the pulverizing ratio of step (b) is about 30% to about 10%.

13. The method of claim 10 or 12 in which the pulverized particles have an average diameter not greater than 50 microns.

14. A thermally stable, thermal shock resistant extruded cordierite body having a coefficient of thermal expansion in all directions not greater than $16.0 \times 10^{-7}/°C.$ over the range of 25° to 1000° C. produced by the method of claim 10.

* * * * *